(12) United States Patent
Clarke

(10) Patent No.: US 7,231,755 B2
(45) Date of Patent: Jun. 19, 2007

(54) WALK-BEHIND IMPLEMENT AND HANDLE ASSEMBLY RELEASE APPARATUS FOR USE WITH SAME

(75) Inventor: Khari S. Clarke, Minneapolis, MN (US)

(73) Assignee: The Toro Company, Bloomington, MN (US)

(*) Notice: Subject to any disclaimer, the term of this patent is extended or adjusted under 35 U.S.C. 154(b) by 99 days.

(21) Appl. No.: 10/790,355

(22) Filed: Mar. 1, 2004

(65) Prior Publication Data

US 2005/0188664 A1 Sep. 1, 2005

(51) Int. Cl.
*A01D 34/64* (2006.01)
(52) U.S. Cl. ............... 56/14.7; 56/1; 56/DIG. 18; 280/47.315; 280/47.371; 280/47.36
(58) Field of Classification Search ............... 56/1, 56/2, 14.7, 16.7, DIG. 18; 280/47.315, 47.371, 280/47.36
See application file for complete search history.

(56) References Cited

U.S. PATENT DOCUMENTS

| 599,208 | A |   | 2/1898  | White |
|---|---|---|---|---|
| 1,048,908 | A |   | 12/1912 | Stewart |
| 2,624,168 | A | * | 1/1953  | Clemson ............... 56/249 |
| 2,658,322 | A |   | 11/1953 | Sullivan |
| 2,786,694 | A |   | 3/1957  | Gray |
| 3,196,971 | A | * | 7/1965  | Schantz ............... 180/19.2 |
| 3,527,469 | A |   | 9/1970  | Gobin |
| 3,534,432 | A |   | 10/1970 | Davies et al. |
| 3,694,855 | A |   | 10/1972 | Meyer et al. |
| 3,702,016 | A | * | 11/1972 | Keesee ............... 16/437 |
| 3,764,156 | A |   | 10/1973 | Nepper et al. |
| 3,791,116 | A |   | 2/1974  | Wykhuis |
| 3,817,547 | A |   | 6/1974  | Erickson |
| 4,012,052 | A |   | 3/1977  | Engdahl |
| 4,015,407 | A | * | 4/1977  | Bacon ............... 56/255 |
| 4,108,456 | A |   | 8/1978  | Woelffer et al. |
| 4,132,280 | A |   | 1/1979  | Jones et al. |
| 4,294,027 | A |   | 10/1981 | Edwards |
| 4,392,538 | A |   | 7/1983  | Goertzen |
| 4,561,239 | A | * | 12/1985 | Cook ............... 56/320.1 |
| 5,163,275 | A |   | 11/1992 | Hare et al. |
| 5,261,215 | A |   | 11/1993 | Hartz et al. |
| 5,435,119 | A |   | 7/1995  | Leibengood |
| 5,447,217 | A | * | 9/1995  | Chou ............... 190/18 A |
| 5,630,488 | A | * | 5/1997  | Chen ............... 190/115 |
| 5,636,504 | A |   | 6/1997  | Kaley et al. |

(Continued)

OTHER PUBLICATIONS

U.S. Appl. No. 10/942,427, filed Sep. 16, 2004, Stover et al.

*Primary Examiner*—Thomas B. Will
*Assistant Examiner*—Alicia Torres
(74) *Attorney, Agent, or Firm*—Mueting, Raasch & Gebhardt, P.A.

(57) ABSTRACT

A walk-behind implement, e.g., lawn mower, having a handle assembly, and a handle assembly release apparatus for use with such an implement. The release apparatus, in one embodiment, may permit unlocking of the handle assembly from a first operating position relative to a housing of the implement. Once unlocked, the handle assembly may be moved, e.g., pivoted, to a second storage position. In one embodiment, the release apparatus may include a lever member that may be actuated by the application of a force applied by an operator's foot.

6 Claims, 9 Drawing Sheets

U.S. PATENT DOCUMENTS

| | | |
|---|---|---|
| 6,101,678 A | 8/2000 | Malloy et al. |
| 6,415,588 B1 | 7/2002 | Kao |
| 6,698,173 B2 | 3/2004 | Joseph |
| 2003/0182919 A1 | 10/2003 | Baumann et al. |

* cited by examiner

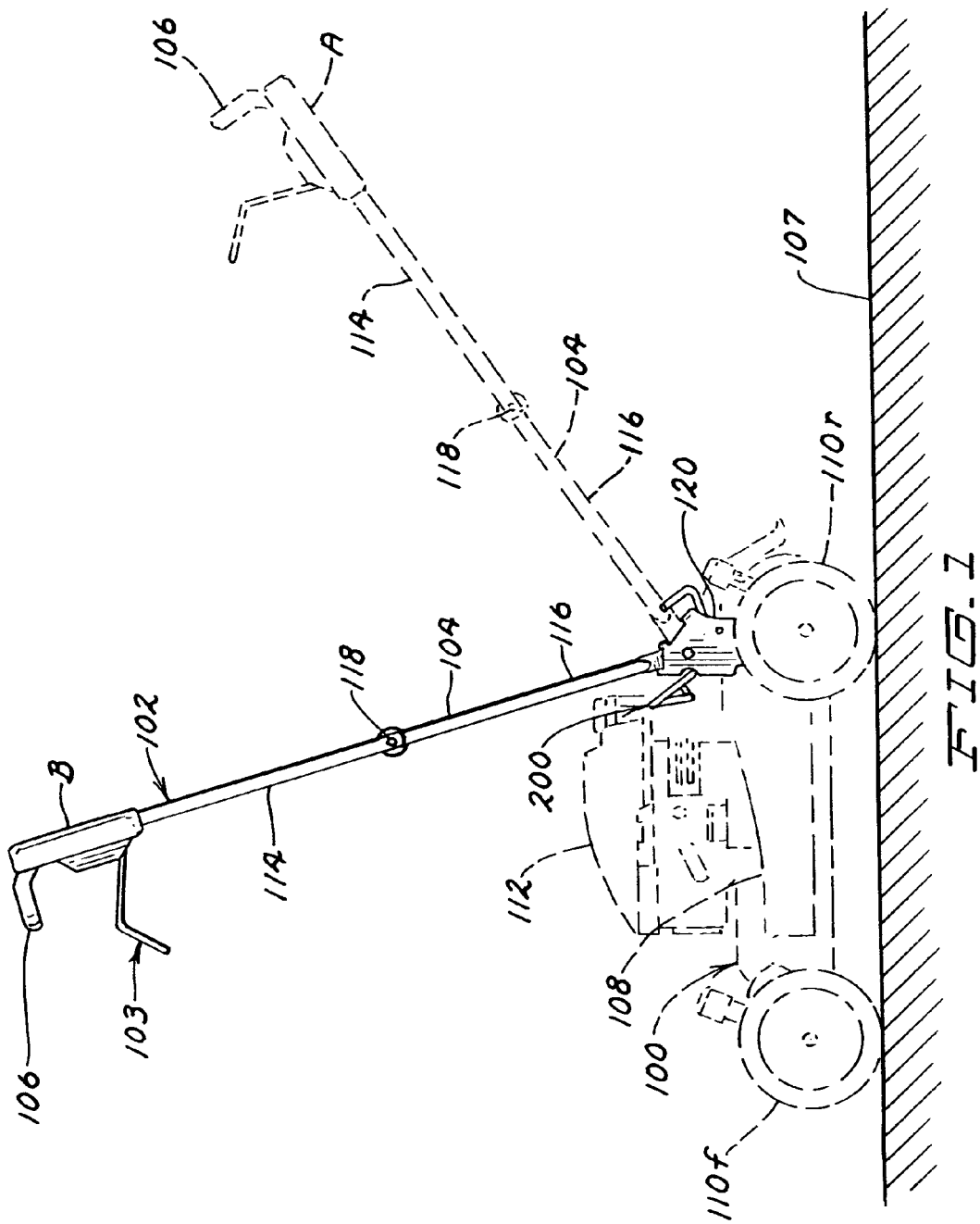

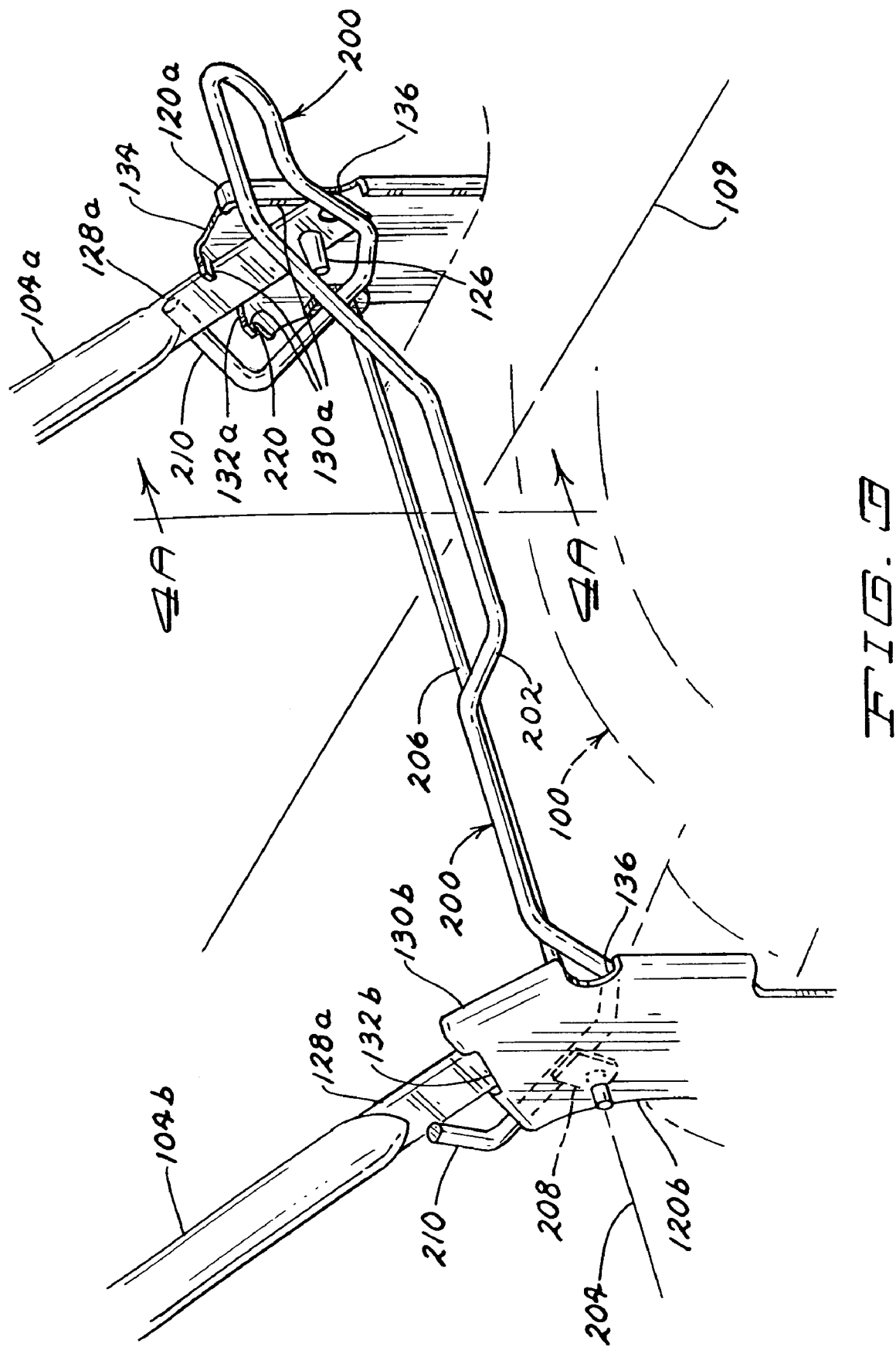

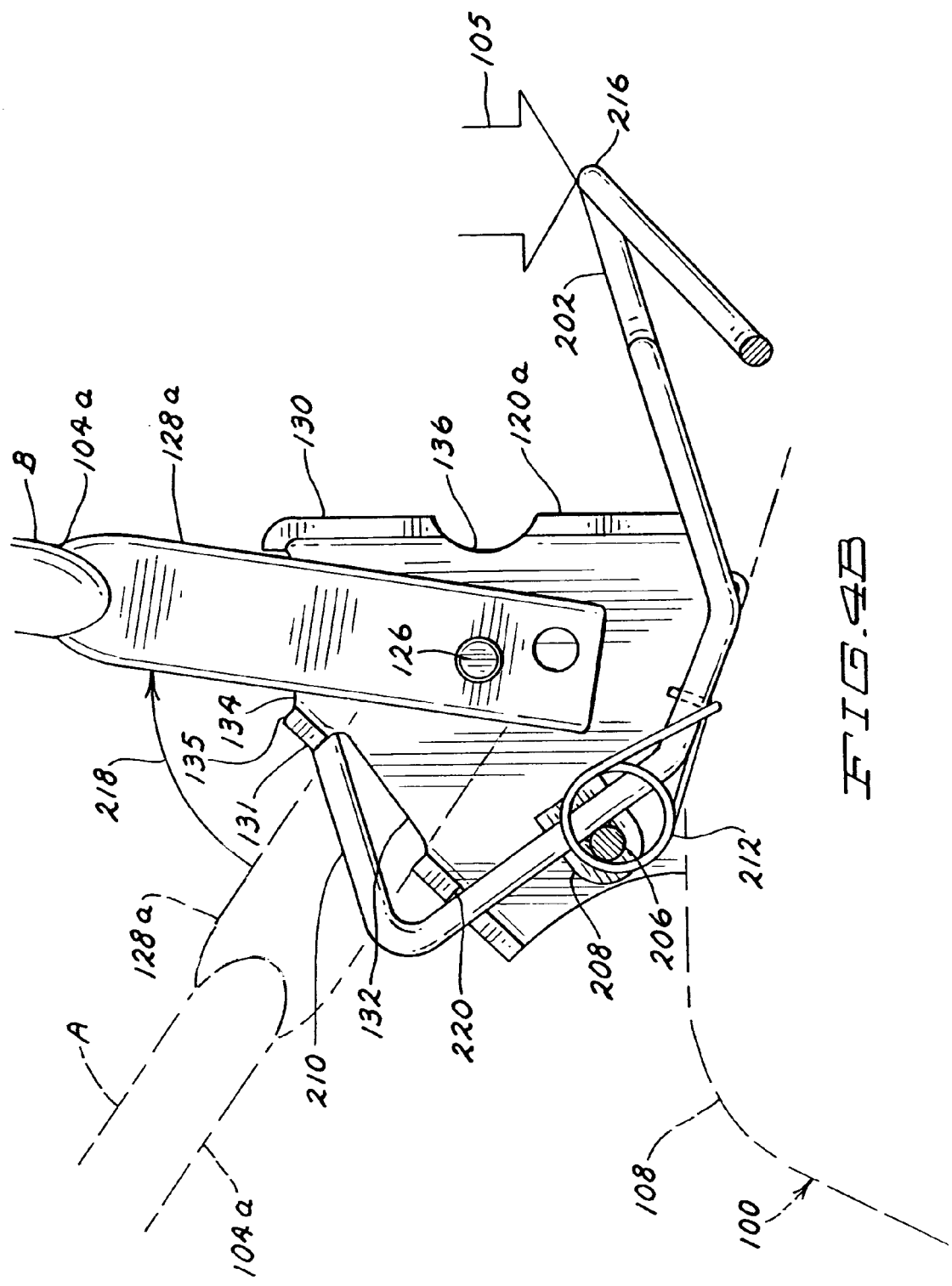

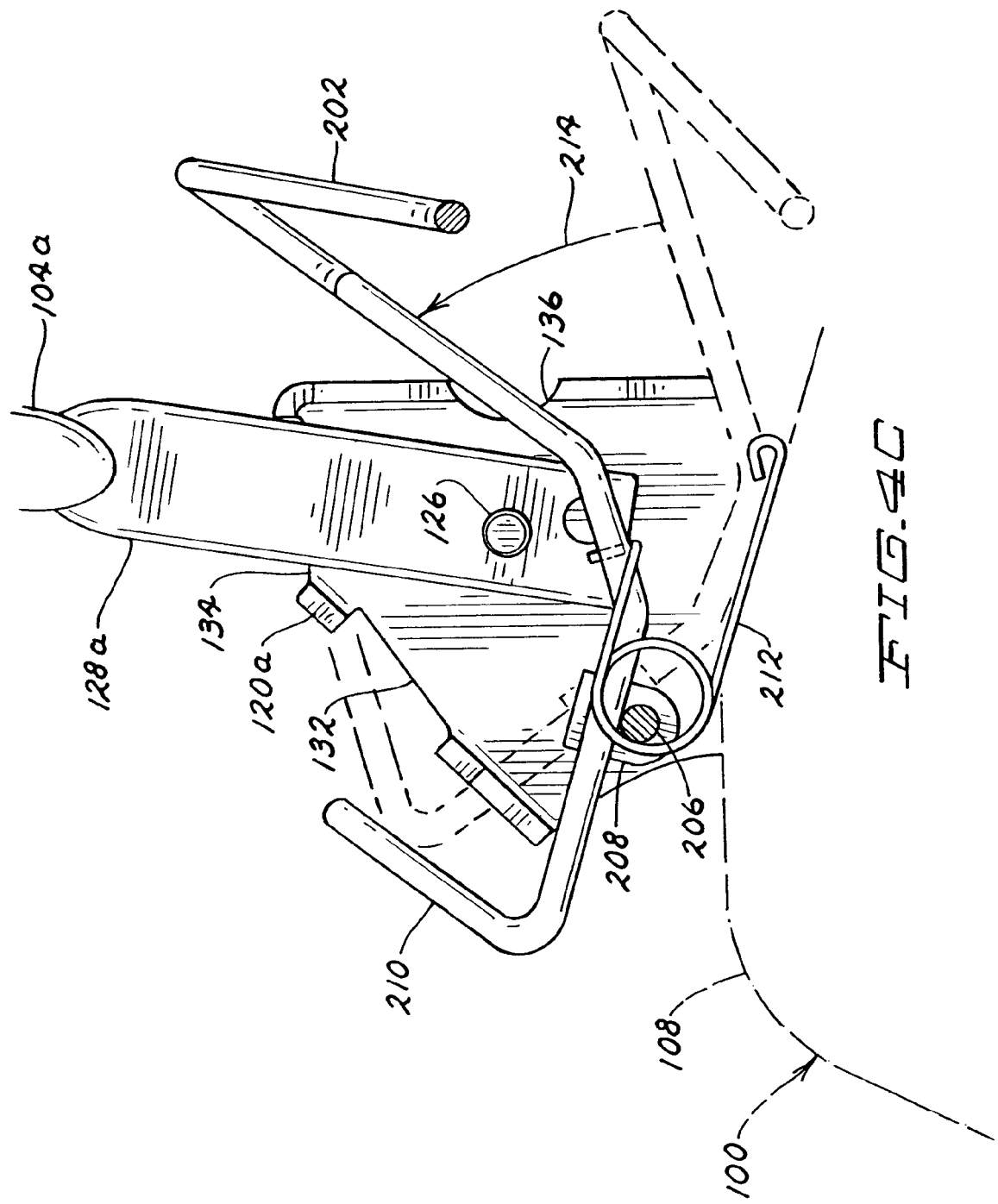

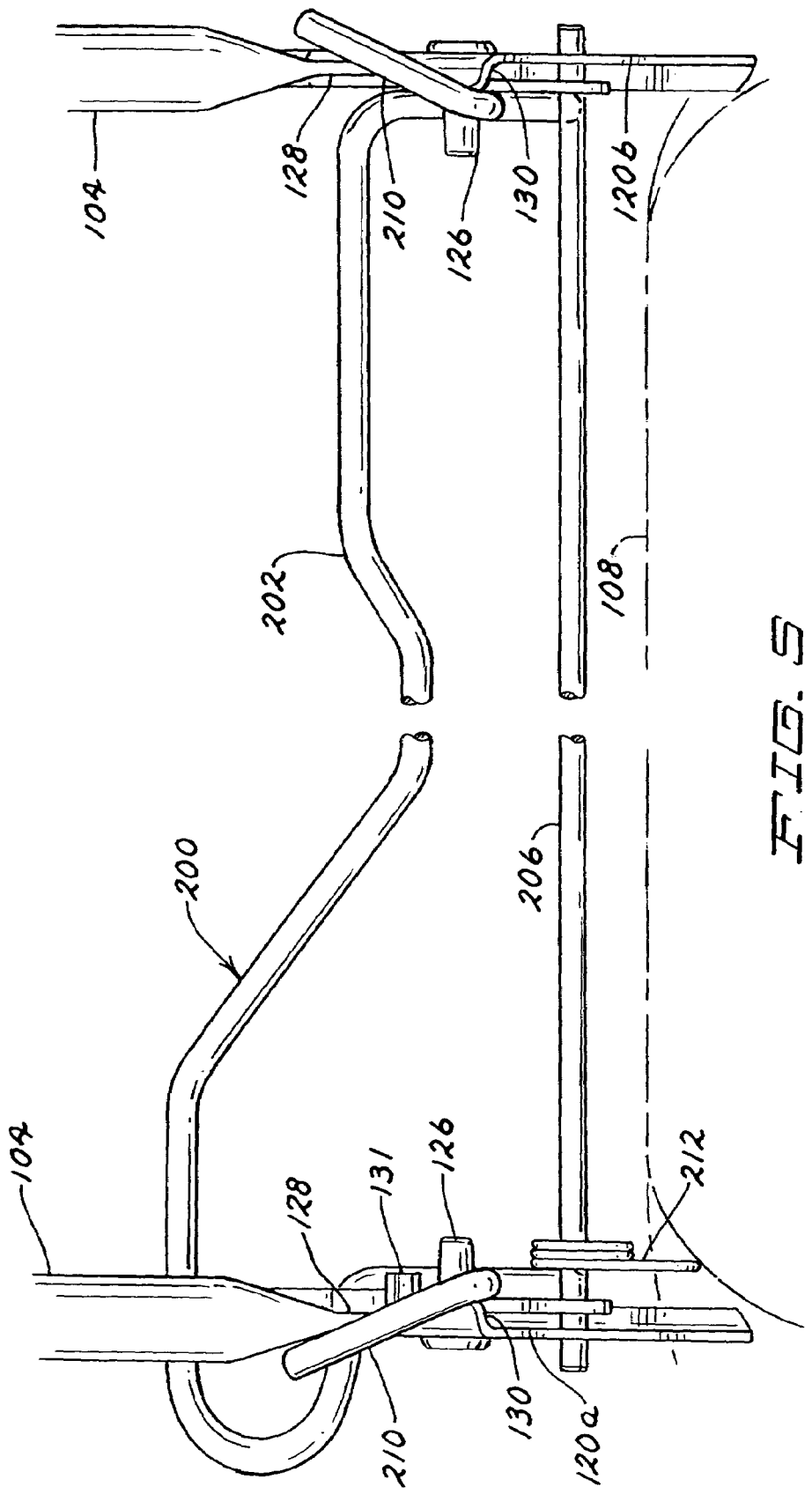

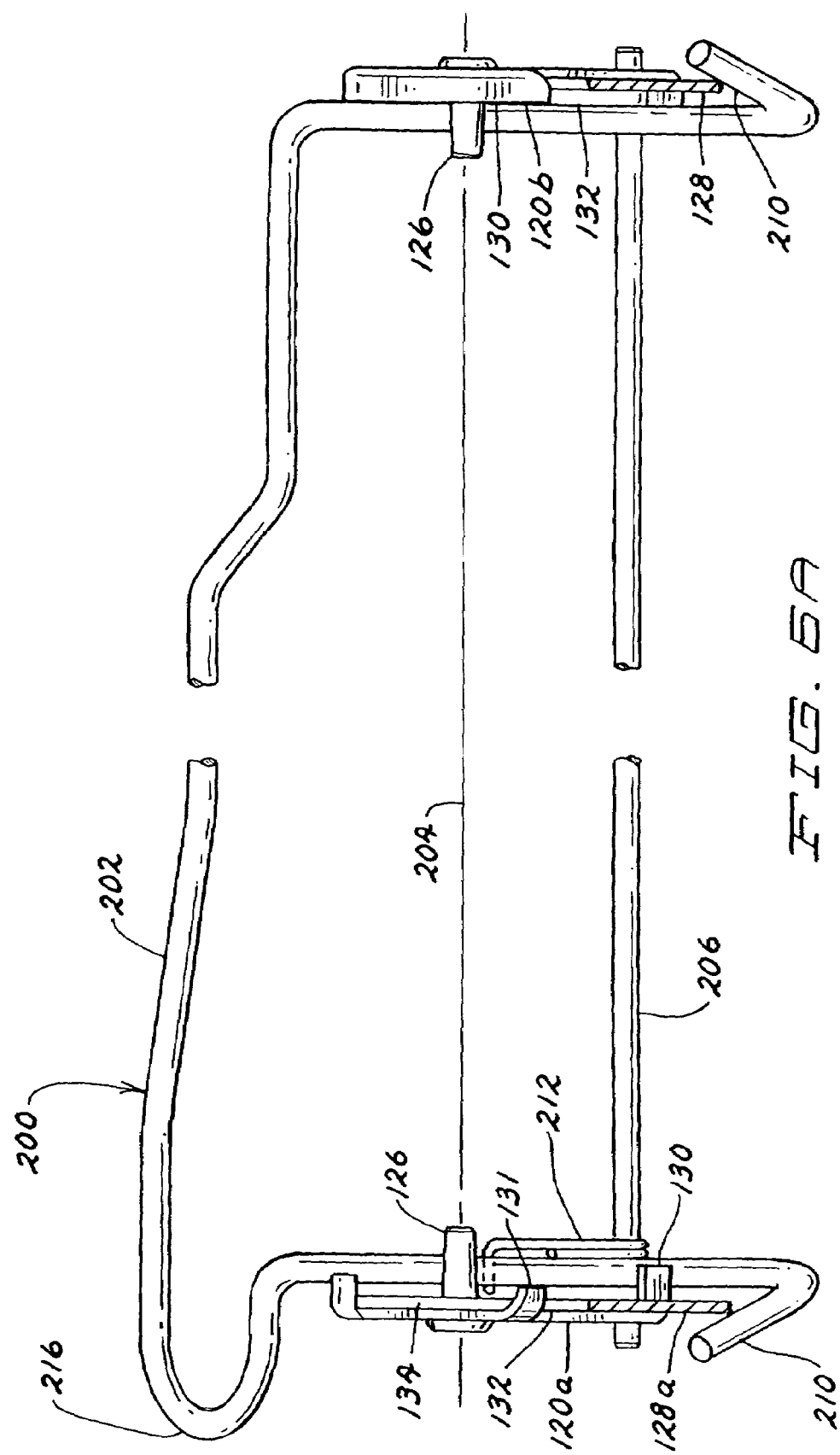

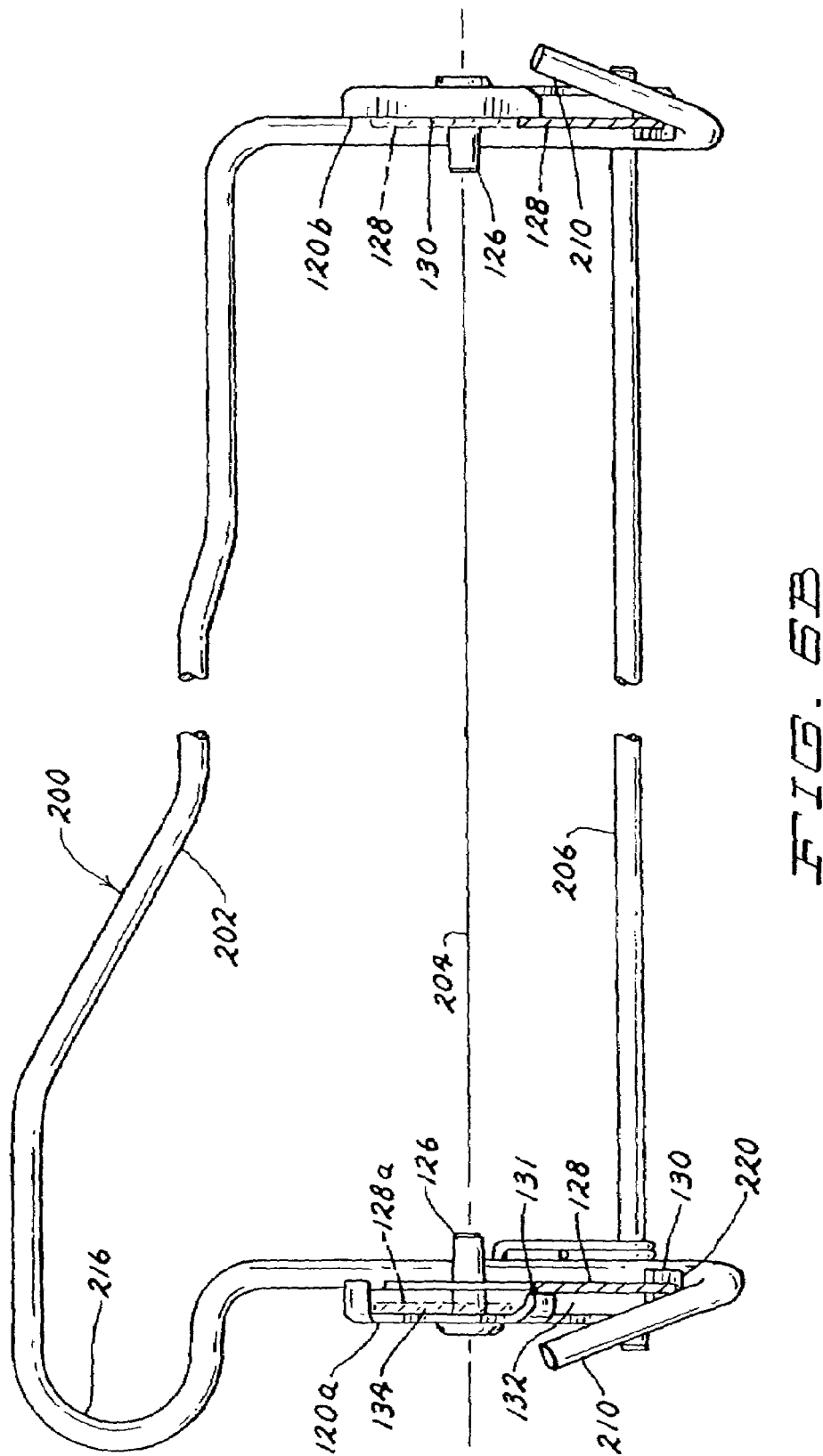

WALK-BEHIND IMPLEMENT AND HANDLE ASSEMBLY RELEASE APPARATUS FOR USE WITH SAME

TECHNICAL FIELD

The present invention relates to a walk-behind implement such as a lawn mower having a handle assembly and, more specifically, to a foot-actuated handle assembly release apparatus for use with the same.

BACKGROUND

Rotary lawn mowers are generally known in the art. Typically, such mowers include a wheeled housing forming a cutting chamber in which a rigid cutting blade rotates. A generally U-shaped handle assembly extending upwardly and rearwardly from the housing allows a walking operator to guide and manipulate the mower. The handle assembly may include two transversely spaced handle members, e.g., tubes, joined together at their respective upper ends by a cross tube forming a hand grip portion of the handle assembly. The handle assembly may be rigidly locked to the housing during operation of the mower so that the user may impart directional and control forces to the mower through the handle assembly.

While effectively configured for operation, the handle assembly, when in this conventional operating position, may extend substantially rearwardly beyond the mower housing. Thus, the mower may take up what is considered to be excessive room when not in use, i.e., when the mower is stored with the handle assembly in its conventional operating position, the mower may have a relatively large storage footprint.

To remedy this situation, mowers in which the handle assembly folds relative to the housing have been developed. Such a foldable handle assembly is usually pivotally connected, at its lower end, to the mower housing and is often formed in two sections—a lower section and an upper section—which may also be pivotally connected to one another. Locking mechanisms are provided for securing the handle assembly in its conventional operating position. However, when the locking mechanisms are released, the handle assembly may be pivoted relative to the housing until the lower section of the handle assembly extends generally vertically over the housing. In some mower configurations, the upper section of the handle assembly may also be folded back over the lower section to further reduce storage volume.

While effective, some implementations of foldable handle assemblies do have drawbacks such as, for instance, requiring time consuming and/or complex manual interaction on the part of the operator to initiate folding. To illustrate, when it comes time to move some of these folding handle assemblies out of their conventional operating position, the user typically must unlock both handle tubes from the housing to allow the handle assembly to be pivoted to its stored position. Since the locking mechanism is usually at the base of the handle assembly (near where the lower ends of the handle tubes connect to the housing) manipulation of the locking mechanisms on both sides of the mower housing may involve bending down, or even getting on one's knees. Such interaction may be inconvenient, or for some operators, difficult to accomplish.

To alleviate this problem, some mowers have utilized alternative locking mechanisms. For example, see U.S. Pat. No. 5,435,119 to Leibengood. The '119 patent describes a hand-actuated device that applies a load between both lower ends of the mower handle in an effort to displace the ends and thus unlatch them from the mower frame. While effective, Leibengood applies the load directly between the members of the handle assembly. As a result, one member may potentially be displaced more than the other, resulting in only partial disengagement of the handle assembly (e.g., only one handle end) from the mower housing.

SUMMARY

The present invention provides walk-behind implements, e.g., lawn mowers, having an operator handle assembly, and handle assembly release apparatus for use with such implements. The release apparatus permits unlocking of the handle assembly from a housing of the implement so that the handle assembly may be repositioned (e.g., moved from an operating position to a storage position). In some embodiments, the apparatus may be actuated by the operator's foot.

In one embodiment, a walk-behind outdoor power equipment unit is provided. The unit includes a housing operable for movement over a ground surface, and a handle assembly having a first handle member and a second handle member each pivotally coupled to the housing. The handle assembly may be selectively locked, relative to the housing, in a first operating position. The unit also includes a handle assembly release apparatus associated with the handle assembly. The handle assembly release apparatus includes a release member operable to impart a releasing force simultaneously to each of the first and second handle members to unlock the handle assembly from the first operating position. The releasing force is at least partially reacted by the housing.

In another embodiment, a walk-behind lawn mower is provided. The mower includes a housing operable for movement over a ground surface, and a handle assembly having at least one handle member. The handle assembly is pivotally coupled to the housing and operable to be selectively locked, relative to the housing, in a first operating position. The mower also includes a handle assembly release apparatus associated with the handle assembly, wherein the handle assembly release apparatus has a lever pivotable about an axis transverse to a longitudinal axis of the mower. The release apparatus is operable to impart a releasing force to the at least one handle member to unlock the same from the first operating position.

In yet another embodiment, a walk-behind lawn mower is provided having a housing operable for movement over a ground surface. The mower also includes a handle assembly having a handle member, where the handle member is pivotally coupled to a handle retention portion of the housing and operable to be locked in at least a first operating position relative to the housing. A handle assembly release apparatus associated with the housing is also provided. The handle assembly release apparatus includes a release member pivotable about an axis transverse to a longitudinal axis of the mower, where the release member is operable to selectively slide between the handle member and the handle retention portion.

The above summary of the invention is not intended to describe each embodiment or every implementation of the present invention. Rather, a more complete understanding of the invention will become apparent and appreciated by reference to the following detailed description and claims in view of the accompanying drawing.

BRIEF DESCRIPTION OF THE VIEWS OF THE DRAWING

The present invention will be further described with reference to the figures of the drawing, wherein:

FIG. 1 is a side elevation view of a walk-behind implement, e.g., rotary lawn mower, in accordance with one embodiment of the present invention, illustrating a handle assembly in both a first operating position (position A) and a second storage position (position B);

FIG. 3 is a perspective view of a portion of the lawn mower of FIG. 1;

FIG. 4B is the section view of FIG. 4A with the handle assembly release apparatus shown in an actuated position and the handle assembly shown in the second storage position;

FIG. 4C is the section view of FIG. 4B but with the handle assembly release apparatus shown returned to the normal position and the handle assembly in the second storage position;

FIG. 5 is a partial rear elevation view of the lawn mower and handle assembly release apparatus of FIG. 1;

FIG. 6A is a view taken along line 6A—6A of FIG. 4A illustrating the handle assembly release apparatus in the normal position with some structure removed for clarity; and FIG. 6B is the view of FIG. 6A illustrating the handle assembly release apparatus of FIG. 3 in the actuated position.

DETAILED DESCRIPTION OF EXEMPLARY EMBODIMENTS

Figure 2A:
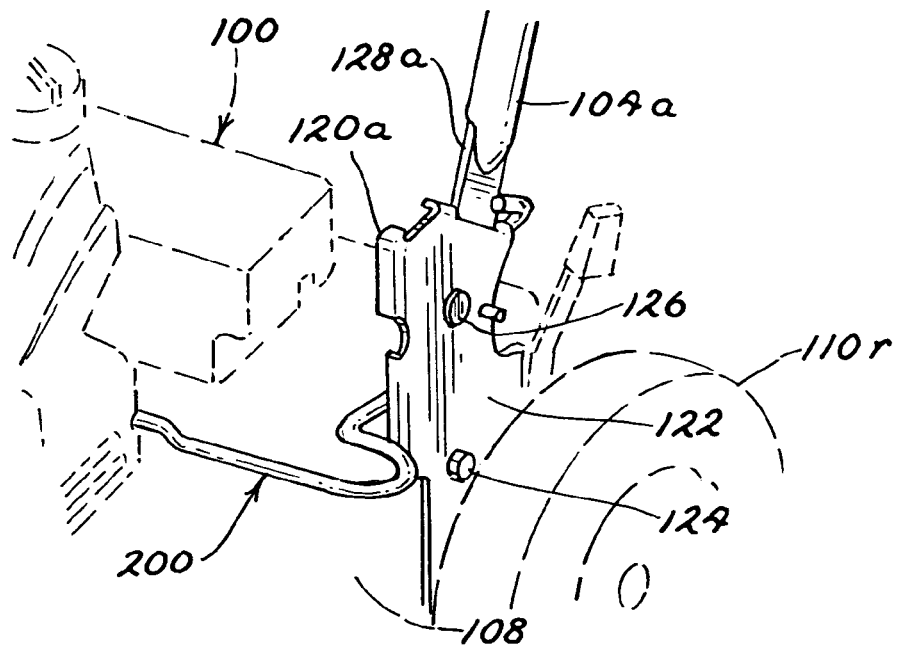
FIG. 2A is an enlarged perspective view of a portion of the lawn mower of FIG. 1 illustrating a handle assembly release apparatus in accordance with one embodiment of the present invention.

In the following detailed description of exemplary embodiments, reference is made to the accompanying figures of the drawing which form a part hereof, and in which are shown by way of illustration specific embodiments in which the invention may be practiced. It is to be understood that other embodiments may be utilized and structural changes may be made without departing from the scope of the present invention.

Generally speaking, the present invention is directed to apparatus and methods for permitting unlocking and movement of a handle assembly of a walk-behind implement, e.g., a rotary lawn mower, between a first operating position and at least a second storage position. As a result, the footprint of the implement may be quickly and easily reduced for storage.

While described herein in the context of a walk-behind rotary lawn mower, those of skill in the art will appreciate that the apparatus and methods of the present invention could be used with most any walk-behind power equipment unit or implement including, for example, reel mowers, string mowers, snow throwers, tillers, aerators, and the like.

Horizontal, vertical, and other similar terms may be used herein to identify general directions and/or orientations of various parts and assemblies. It is to be understood that these terms are not necessarily absolute, e.g., horizontal (or vertical) may be used to indicate an element that is substantially horizontal (or vertical).

Similarly, the suffixes "a" and "b" may be used throughout this description to denote various left and right side parts/features, respectively. However, unless otherwise noted, the parts/features denoted with "a" and "b" suffixes are substantially identical to, or mirror images of, one another. It is understood that, unless otherwise noted, the description of an individual part/feature, e.g., the description of a part/feature identified with an "a" suffix, also applies to the opposing part/feature, e.g., the part/feature identified with a "b" suffix. Similarly, the description of a part/feature identified with no suffix applies to both the corresponding left and right part/feature, e.g., to both the part/feature identified with the "a" suffix and the "b" suffix.

Referring to FIG. 1, a handle assembly of a walk-behind power equipment unit, e.g., a rotary lawn mower 100, is generally indicated as 102. The handle assembly 102 may be generally U-shaped and include a first and second handle member, e.g., upwardly extending handle members 104, joined together at their upper ends by a cross rod 106. The cross rod 106 may form a hand grip portion of the handle assembly 102 that is operable to receive hands of an operator during operation of the mower 100. The handle assembly 102 may also include operator controls 103 such as throttle and blade and/or drive control bales.

The power equipment unit, e.g., mower 100, may include a housing 108 having two or more ground engaging members such as wheels 110, e.g., two front wheels 110*f* and two rear wheels 110*r* (only one of each shown in FIG. 1) that allow rolling movement of the housing 108 over a ground surface 107. A rotatable cutting element or blade (not shown) may rotate within a cutting chamber formed by the housing 108. The cutting element 108 may sever grass or other vegetation at a pre-determined height above the ground as the housing 108 passes over. A prime mover, e.g, internal combustion engine 112, may provide rotational power to the cutting element and, optionally, driving power to one or more of the wheels 110 (e.g., one or more of front wheels 110*f* or rear wheels 110*r*).

Figure 2B:
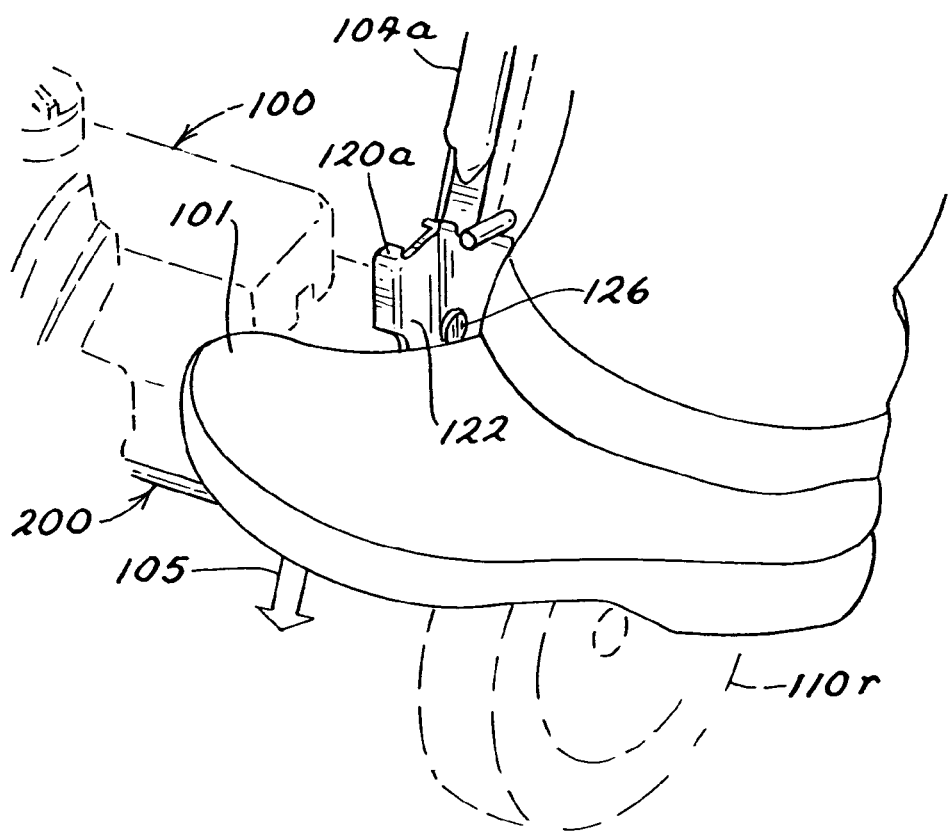
FIG. 2B is a perspective view of the portion of the lawn mower of FIG. 2 illustrating actuation of the handle assembly release apparatus in accordance with one embodiment of the invention.

Generally speaking, apparatus and methods of the present invention permit unlocking of the handle assembly 102 from a first operating position (see position A in FIG. 1) by manipulation of a handle assembly release apparatus 200. Once unlocked, the handle assembly may be moved, e.g., pivoted, to at least a second storage position (see position B in FIG. 1). In some embodiments, the handle assembly release apparatus 200 is actuatable by an operator's foot 101 as generally illustrated in FIGS. 2A and 2B and further described below. That is, the operator may unlock the handle assembly 102 from the first operating position A and move it to the second storage position B by depressing a portion of the handle assembly release apparatus 200 with his or her foot 101. The apparatus 200 may unlock, or otherwise release, the rigid interconnection of the handle assembly 102 to the housing 108 so that the handle assembly 102 may be moved from the first operating position A.

The exact configuration of the handle assembly 102, and thus the handle members 104, may vary without departing from the scope of the invention. However, in one embodiment, the handle assembly 102 is formed by two separate upper and lower sections 114 and 116 as shown in FIG. 1. The sections 114 and 116 may be pivotally connected to one another at one or more pivot joints 118. The pivot joints may be configured in most any manner including, for example, a fastener passing through openings in both sections 114 and 116. A fastening component, e.g., threaded knob, may be associated with each pivot joint 118 to permit tightening and loosening of the pivot joints. For example, the pivot joints 118 may be tightened to secure the sections 114 and 116 to form the rigid handle assembly 102 shown in FIG. 1. The pivot joints may also be selectively loosened so that the upper section 114 of the handle assembly 102 may fold relative to the lower section 116 (not shown) when desired, e.g., to further reduce occupied space for long-term storage as further described below.

The handle members 104 may connect, e.g., at their lower ends, to the housing 108 of the mower 100. In some embodiments, the housing 108 may include first and second handle retention portions 120a and 120b located along each side of the housing 108 (see, e.g., FIG. 3). While the retention portions 120 are shown positioned at or near a rear side of the housing 108, they may, in other embodiments, be located at most any position on the housing.

FIGS. 2A and 2B illustrate enlarged perspective views of the mower 100 in the vicinity of the retention portion 120a. Each retention portion 120 of the illustrated embodiment may include a generally vertical plate member 122 attached to a rear portion of the mower 100. In some embodiments, each retention portion 120 may also include one or more openings to allow fasteners, e.g., bolts 124, to secure the retention portions 120 to the housing 108. While illustrated as utilizing fasteners 124 to secure to the retention portion 120 to the housing 108, other embodiments may utilize most any attachment technique, e.g., other mechanical interconnections, welding, gluing, etc., or combination of attachment techniques. Alternatively, the retention portions 120 could be integrally formed with the housing 108. Regardless of how the retention portion is interconnected though, an upper portion of the plate member 122 of each retention portion 120 preferably extends a short distance above an upper surface of housing 108 as shown in the figures (see e.g., FIG. 2A).

The retention portions 120 may be made or stamped from a metallic material and have some degree of resilience or flexibility relative to one another. In other words, each retention portion 120 may slightly flex from side to side, e.g., towards and away from one another. This deflection may be accommodated by having one or both retention portions 120 flex relative to the housing 108, by having the retention portions 120 generally rigid relative to the housing 108 and having the housing itself flex, or a combination of both.

An upper portion of each retention portion 120 may define a pivot axis (e.g., a generally transverse pivot axis) about which the handle assembly 102 may pivot. In the illustrated embodiments, the pivot axis is defined by stub shafts 126 on each retention portion 120 as shown in FIGS. 2A, 2B, and 3 (only one stub shaft shown in these views). The retention portions 120 are generally aligned with one another on the housing 108 so that the stub shafts 126 of each retention portion 120 form a common pivot axis.

As FIG. 3 further illustrates, the handle members 104 may be tubular in shape. However, at their respective lower ends, they may each include a flat portion 128. In some embodiments, each flat portion 128 is formed by flattening ends of the handle members 104. The flat portions 128 may each include an opening that receives its respective stub shaft 126 as generally shown in FIG. 3. Once assembled, the handle assembly 102 may thus be pivoted about the stub shafts 126, (i.e., relative to the housing 108) as indicated by positions A and B in FIG. 1.

The upper portion of each retention portion 120 may further include an inwardly facing edge or lip 130. Each lip 130 is preferably positioned adjacent one side, e.g., an outboard side, of the respective handle member 104 (e.g., flat portion 128) to which it is journalled as shown in FIG. 3. Thus, as the handle assembly 102 is pivoted relative to the housing 108, each flat portion 128 of the handle members 104 will trace an arc (about the stub shafts 126) that passes along, and in close proximity to, its respective lip 130. In the illustrated embodiments, the handle members 104 are preferably biased outwardly relative to one another to maintain each flat portion 128 of the handle members 104 in an abutting relationship with the lip 130 of its respective retention portion 120.

One or more of the lips 130 of the retention portions 120 may be configured to receive and hold the handle members 104, relative to the housing 108, in at least the operating position A (FIG. 1) and the storage position B (FIG. 1). Optionally, the lips 130 may include provisions to hold the handle members 104 in a third position. For example, the third position may correspond to a long-term storage position in which the handle assembly 102, e.g., lower portion 116, extends more forwardly, or even horizontally, over the mower housing 108. The upper portion 114 may then be folded over on the lower portion 116.

To permit securing or locking of the handle assembly 102 in the various positions relative to the housing 108, the lip 130 of one or both retention portions 120 may include a first positive slot or detent, e.g., a inwardly facing first recess 132. In the illustrated embodiment, both retention portions includes a first recess 132 as shown in FIG. 3. The first recesses 132 may be shaped to receive therein the respective flat portions 128 of the handle members 104 and preferably provide positive locking for their associated handle members when the handle assembly is in the first operating position A. As a result, both handle members 104 may be generally locked or fixed, relative to the housing 108, in the first operating position. Accordingly, when the operator pushes on the handle assembly 102, he or she does not impart more than the minimal rotation of the handle assembly, relative to the housing 108, that is permitted by the first recess 132. As a result, control forces applied to the handle assembly 102 are mostly transmitted to the housing 108 to push or guide the mower 100.

In the illustrated embodiment, the first recess 132 on each of the retention portions 120 is substantially similar and aligned with the other. However, embodiments wherein the first recess 132 is shaped differently on each retention portion 120 are also possible.

Figure 4A:
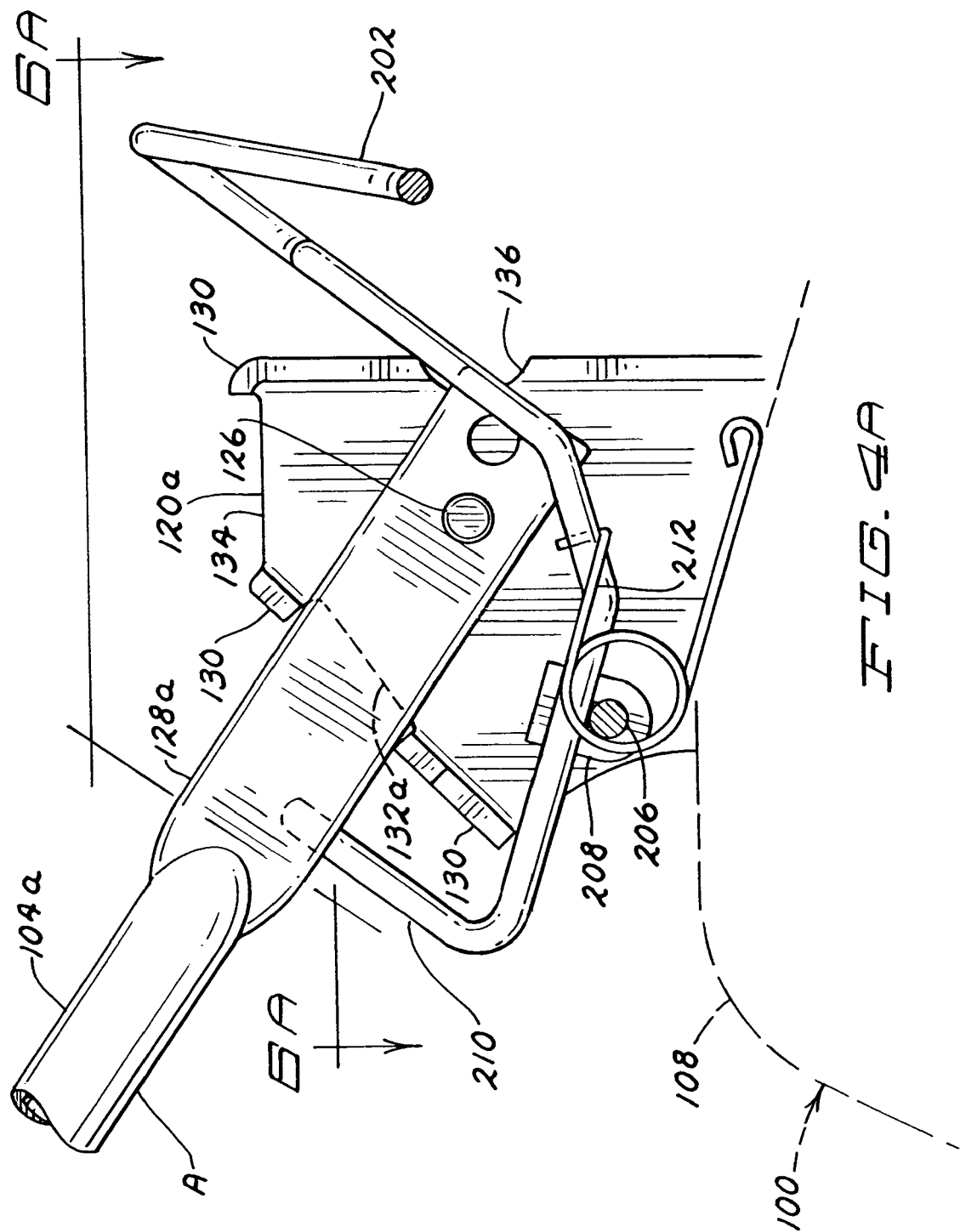
FIG. 4A is a section view taken along line 4A—4A of FIG. 3, illustrating the handle assembly release apparatus in a normal position and the handle assembly in the first operating position (position A)

FIGS. 3 and 4A illustrate the handle assembly 102 when the flat portions 128 of the handle members 104 are located within the first recesses 132, e.g., when the handle assembly is secured, e.g., locked, in the operating position A of FIG. 1. To reposition the handle assembly 102 from the operating position to the storage position B of FIG. 1, the flat portions 128 may be freed, e.g., unlocked, from the first recesses 132 sufficiently to permit the handle members 104 to pivot relative to the retention portions 120, e.g. pivot forwardly or counterclockwise in FIG. 1. That is, the handle members 104 may separate or move away, e.g., move inwardly, from the first recesses 132 until the flat portions 128 are physically disengaged from the first recesses. This inward movement is allowed, at least in part, because each handle member 104 may be deflected sufficiently inwardly against its normal outward bias to allow the flat portion 128 of the respective handle members to clear the first recesses 132. As described above, disengagement may be alternatively or further assisted by corresponding outward deflection of the retention portions 120.

Once the handle members 104 are disengaged from the first recesses 132, the operator may pivot the handle members 104 between position A and position B (see FIG. 1). One or both retention portions 120 may include an inwardly facing second recess 134 that may be offset forwardly along the lip 130 from the first recess 132 as shown in FIG. 3. The second recess 134 corresponds to the handle assembly 102 being in the second storage position B. Because the mower 100 does not need to maintain the same rigidity of the handle assembly 102 relative to the housing 108 when the handle assembly is in the second storage position B, the second recess 134 may be provided on only one retention portion 120, e.g., the retention portion 120a, as indicated in FIG. 3.

If the handle assembly 102 is placed in its second storage position, at least one handle member, e.g., the handle member 104a, may be received within the second recess 134 as shown in FIG. 4B. The engagement between the handle member 104a and the second recess 134 is preferably sufficient to hold the handle assembly 102 in the second position.

Unlike the first recess 132, however, the second recess 134 may include a rearward edge 135 (FIG. 4B) that is ramped. As a result, if the operator wishes to reposition the handle assembly 102 to the first operating position A, pulling rearwardly on the handle assembly will allow the flat portion 128 of the handle member 104 to ride up the ramp ("cam out") of the second recess 134 and travel towards the first recess 132. That is, in one embodiment, no interaction of the handle assembly release apparatus 200 is required to unlock the handle assembly 102 from the second storage position B. Once the flat portions 128 reach the appropriate location, they may again engage their respective first recesses and securely lock the handle assembly 102 in the first operating position A.

Optionally, the handle assembly 102 may be pivoted forwardly from its second storage position to the third, long-term storage position (not shown) by disengaging the handle member 104a from the second recess 134 and pivoting the handle assembly forwardly, e.g., until the handle members 104 lie over the housing 108. A forward edge of the second recess 134 may also be beveled or ramped so that the handle member 104a may ramp out of the second recess and move easily from the second position B to the third long-term storage position. Alternatively, the handle member 104a may be disengaged from the second recess 134 by manual operator interaction as further described below. After the handle assembly 102 reaches the third long-term storage position, the upper section 114 of the handle assembly 102 may be loosened relative to the lower section 116, e.g., by loosening the pivot joints 118 of FIG. 1, and folded back over the now forwardly extending lower section.

An exemplary handle assembly release apparatus 200 in accordance with one embodiment of the present invention will now be described. In the illustrated embodiments, the release apparatus 200 includes a lever operable to simultaneously deflect or displace both handle members 104 and/or retention portions 120 sufficiently to allow the flat portions 128 of the handle members to disengage (unlock) from the recesses 132. For example, as described above and illustrated in FIGS. 2A and 2B, the handle assembly 102 may be released from the operating position A of FIG. 1 by applying a force, e.g., a downward force 105, to a portion of the release apparatus 200. Once a sufficient force is applied, the flat portions 128 of the handle members 104 may disengage from the respective recesses 132, after which the handle assembly 102 may be moved to the storage position B of FIG. 1.

FIG. 3 illustrates a partial perspective view of the mower 100 with the handle assembly 102 shown in the first operating position. As evident in this view, the apparatus 200, in one embodiment, may include a release member, e.g., a lever or lever member 202, configured to pivot about a pivot axis 204. The pivot axis 204 may be generally horizontal and transverse to a longitudinal axis 109 of the mower 100. The pivot axis 204 may be defined in any number of ways. For example, the pivot axis 204 may be formed by a generally horizontal and transverse cross member 206 spanning across a rear portion of the mower 100. Such a cross member 206 may form part of a rear bagging system such as that described in U.S. Pat. Pub. No. 2003/0182919 A1, entitled "Deck Assembly for a Self-propelled, Walk-behind Rotary Lawn Mower," published Oct. 2, 2003, (see, e.g., hinge rod 143 described therein). Alternatively, the pivot axis 204 could be defined by other structure, e.g., by one or more stub shafts (not shown) projecting inwardly from the retention portions 120.

The shape of the exemplary lever member 202 in the figures is selected to accommodate various mower structure (not shown). However, the lever member 202 could be most any shape, e.g., could have fewer, or more, bends as well as different overall shapes.

To permit lever actuation, the lever member 202 may further include tab portions 208, e.g., one proximate each retention portion 120, that allow connection of the lever member 202 to the cross member 206. The tab portions 208 may be of most any configuration that allows interconnection of the lever member 202 to the cross member 206. For example, the tab portions 208 may be separate components that are secured, e.g., welded, to the lever member 202 as shown. In the illustrated embodiments, each tab portion 208 includes a clearance opening that is operable to receive the cross member 206 during assembly with a clearance fit sufficient to permit relative rotation between the tab portion and the cross member. Alternatively, the lever member 202 could forego the tab portions 208 and instead include clearance holes (to receive the cross member 206) directly on the lever member 202 itself.

The lever member 202 may further include at least one contact portion 210. The phrase "contact portion," as used herein, refers to the portion(s) of the release apparatus 200, e.g., of the lever member 202, that contact the handle members 104 and/or the retention portions 120 during operation of the apparatus. In the illustrated embodiments, the contact portions 210 are formed by ends of the lever member 202, but other configurations may locate the contact portions most anywhere along the surface of the lever member.

Each contact portion 210 may be configured to apply a releasing force to the respective handle member 104 and/or the retention portion 120. For example, the releasing force may be a force that results in simultaneous displacement of the handle members 104 and/or the retention portions 120 transverse to the longitudinal axis 109 of the mower 100). The force is preferably sufficient to permit the disengagement of the flat portions 128 from their respective first recesses 132.

FIG. 4A is a cross section taken along line 4A—4A of FIG. 3 illustrating the left portion of the mower 100, e.g., of the handle assembly 102 and housing 108. In this view, an optional biasing member, e.g., torsion spring 212, is illustrated. The torsion spring 212 may bias the lever member 202 to its normal position (shown in FIG. 4A) as further explained below. The torsion spring 212 may act between a portion of the mower 100 and a portion of the lever member 202 as illustrated in this view. FIG. 4A also illustrates a cutout 136 in the lip 130 of the retention portion 120a. The cutout 136 may be provided to prevent interference of the lip 130 with a corner of the flat portion 128 as the handle members 104 pivot about the stub shaft 126.

When the handle members 104 are in the first operating position, the flat portions 128 are engaged with the respective first recesses 132 of each retention portion 120 as illustrated in FIG. 4A. As mention above, the outward bias of each handle member 104 keeps the handle members engaged with the first recesses 132 of their respective retention portions 120 so that operator-applied forces to the handle assembly 102 are transmitted directly to the mower housing 108 rather than into pivotal motion of the handle assembly 102 about the housing.

FIG. 4B illustrates the same section view as that of FIG. 4A, but with the apparatus 200 in an actuated position and the handle member 104 shown in the second storage position B. The apparatus 200, e.g., lever 202, may be moved from the normal position of FIG. 4A to the actuated position of FIG. 4B by the application of an external force, e.g., the downward force 105, which may be applied with, for example, the operator's foot 126 as shown in FIG. 2B. Application of the downward force 105 pivots the lever member 202 as shown in FIG. 4B. When so pivoted, the contact portions 210 of the lever member 202 cause the flat portions 128 of the handle members 128 to disengage from the first recess 132 such that the handle member 104 can traverse a portion 131 of the lip 130. When the handle portion 104 pivots sufficiently that the flat portion 128 reaches the second recess 134, the bias of the flat portion relative to the retention portion 120 causes the flat portion to engage the second recess. Once so engaged, the handle assembly 102 is generally held in the second storage position B.

At any time after the flat portion 128 has pivoted beyond to the first recess 132, the force 105 applied to the lever member 202 may be released. Once released, the shape of the contact portion 210 causes the lever member 202 to return, e.g., pivot in the direction 214, to its normal or unactuated position as illustrated in solid lines in FIG. 4C. The optional torsion spring 212 may assist with returning the lever member 202 to its normal position.

FIG. 5 illustrates a partial rear view of the mower 100 with various structure removed for clarity. In this view, the release apparatus 200 is illustrated in the normal position of FIG. 4A. To achieve the desired effect upon actuation, the contact portions 210 may, in one embodiment, extend in a generally upwardly, outwardly, and forwardly direction (when the apparatus is in the normal position) as shown in FIG. 5. The contact portions 210 are configured to slide or wedge between each handle member 104, e.g., each flat portion 128, and its respective retention portion 120 upon actuation of the apparatus 200, to force the components apart. As a result, an inner area of each contact portion 210 may contact the flat portion 128 while an outer area of each contact portion may contact the lip 130 of the retention portion 120.

FIGS. 6A and 6B are views taken along line 6A—6A of FIG. 4A showing the apparatus 200 and relevant mower structure (some structure removed for clarity). FIG. 6A shows the apparatus 200 in a normal position and the handle members 104 in the first operating position A (see FIG. 1).

FIG. 6B shows the apparatus 200 in the actuated position and the handle members 104 in a disengaged position relative to the first recesses 132 of the retention portions 120.

During operation of the mower 100, the handle assembly 102 is configured in the operating position A of FIG. 1. In this configuration, each flat portion 128 of each handle member 104 is engaged in the first recess 132 of the corresponding retention portion 120 as illustrated in FIG. 6A. As described above, such engagement allows a generally rigid interconnection (some play may be allowed due to the relative size of the first recess 132 and the flat portion 128) between the handle assembly 102 and the mower housing 108 so that the operator may manipulate the mower effectively.

When the mowing operation is complete, the mower 100 may be transported to a storage location, e.g., a garage. Once the mower 100 is in its storage location, the handle assembly 102 may be unlocked from the operating position A (see FIG. 1) and moved to the storage position B. To reconfigure the mower handle assembly 102 from the operating to the storage position, the operator may actuate the release apparatus 200 as described above. For example, the operator may depress the lever member 202 by applying the downward force 105 (see FIGS. 2B and 4B) to an access portion 216 of the lever member. The downward force 105 causes the lever member 202 to pivot about the cross member 206 in the direction indicated by arrow 218 in FIG. 4B. In some embodiments, the lip 130 on one or both of the retention portions 120 may include a stop 220 (see FIGS. 3, 4B, and 6B) that limits the distance over which the lever member 202 may pivot. In the illustrated embodiments, the stop 220 is provided only on the retention portion 120a.

This pivoting motion causes the contact portions 210 to push against both the handle members 104 (e.g., along the flat portions 128) and the retention portions 120 as illustrated in FIGS. 4B and 6B. The divergent shape of the contact portions 210 results in the application of an inwardly directed force applied to each of the handle members 104. This inwardly directed force is reacted by an outwardly directed force applied by the contact portions 210 to each of the retention portions 120. Stated alternatively, the lever member may slide or wedge generally between the handle members 104 and the retention portions 120, applying a separating force between these components that may displace or deflect the handle member from its respective retention portion.

Once the lever member 202 has been sufficiently pivoted, each flat portion 128 may disengage from its respective first recess 132 as shown in FIG. 6B. As a result, the handle assembly 102 may be pivoted, about the pivot axis 204, towards the stored position B of FIG. 1. Afer pivoting slightly, the handle members 104 may slide against the inner edges of the lips 130. As a result, the downward force 105 applied to the lever member 202 may be released. The lever member 202 may then return, in the direction 214, to the position illustrated in FIG. 4C. The operator may continue to pivot the handle assembly 102 forwardly until the flat portion 128a reaches the second recess 134, whereby it engages the second recess and holds (detents) the handle assembly 102 in the second storage position B.

In some embodiments, the handle assembly 102 may be pivoted to the third, long-term storage position (not shown) as already discussed above. To reach the third position, the operator may deflect the handle member 104a, e.g., the flat portion 128a, inwardly until it is disengaged from the second recess 134. At that point, the handle assembly 102 may be pivoted forwardly over the housing 108. If desired, the pivot joints 118 may be loosened and the upper section 114 of the handle assembly 102 may be folded back over on the lower portion 116.

To return the handle assembly 102 from the storage position B of FIG. 1 to the operating position A, the operator may firmly pivot the handle assembly without interacting with the handle assembly release apparatus 200. That is, the rearward edge 135 (see FIG. 4B) of the lip 130 on the second recess 134 is sufficiently ramped to permit the handle member 104a to cam out of the second recess and move towards the first recess 132. Once the handle members 104 reach and engage the respective first recesses 132, the mower 100 is again ready for operation.

Mowers 100 and handle assembly release apparatus 200 of the present invention may thus provide advantages over known prior art devices. For instance, the handle assembly 102 of the present invention may be locked in the operating position, with both handle members 104 being substantially restrained against relative rotation by the first recesses 132. However, the handle assembly 102 may be unlocked with a simple operator action, e.g., applying gentle foot pressure, and pivoted to its storage position. In addition, retention portions 120 may define other handle positions in addition to the operating position. For example, a second storage position may be provided to locate the handle assembly 102 in a generally vertical position relative to the housing 108. The handle assembly 102 may be detented or held in place in this second storage position. Yet, the handle assembly 102 may be easily released from this second storage position simply by pushing or pulling on the handle assembly 102, whereby the detents give way to allow the handle assembly 102 to move again to the operating position.

The complete disclosure of the patents, patent documents, and publications cited in the Background, the Detailed Description of Exemplary Embodiments, and elsewhere herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention.

What is claimed is:

1. A walk-behind lawn mower comprising:
a housing operable for movement over a ground surface;
a handle assembly comprising a handle member, the handle member pivotally coupled to a handle retention portion of the housing and operable to be locked in at least a first operating position relative to the housing; and
a handle assembly release apparatus associated with the housing, wherein the handle assembly release apparatus comprises a release member pivotable about an axis transverse to a longitudinal axis of the mower, the release member operable to selectively slide between the handle member and the handle retention portion.

2. A walk-behind lawn mower, comprising:
a housing operable for movement over a ground surface, the housing comprising a handle retention portion;
a handle assembly comprising at least one handle member, the handle assembly pivotally coupled to the handle retention portion of the housing and operable to be selectively locked, relative to the housing, in a first operating position; and
a handle assembly release apparatus associated with the handle assembly, wherein the handle assembly release apparatus comprises a lever pivotable about an axis transverse to a longitudinal axis of the mower and operable to impart a releasing force to the at least one handle member to unlock the handle assembly from the first operating position, and further wherein the lever comprises a contact portion operable to slide between the handle retention portion and the at least one handle member.

3. A walk-behind outdoor power equipment unit comprising:
a housing operable for movement over a ground surface, the housing comprising a first handle retention portion and a second handle retention portion;
a handle assembly comprising a first handle member and a second handle member pivotally coupled, respectively, to the first handle retention portion and the second handle retention portion, wherein the handle assembly may be selectively locked, relative to the housing in a first operating position; and
a handle assembly release apparatus associated with the handle assembly, wherein the handle assembly release apparatus comprises a release member operable to both pivot about an axis transverse to a longitudinal axis of the unit, and impart a releasing force simultaneously to each of the first and second handle members to unlock the handle assembly from the first operating position, the releasing force at least partially reacted by the housing, the release member comprising contact portions operable to simultaneously slide between both the first handle retention portion and the first handle member, and between the second handle retention portion and the second handle member.

4. A walk-behind outdoor power equipment unit comprising:
a housing operable for movement over a ground surface, the housing comprising a first handle retention portion and a second handle retention portion;
a handle assembly comprising a first handle member and a second handle member pivotally coupled, respectively, to the first handle retention portion and the second handle retention portion, wherein the first handle retention portion comprises a lip against which the first handle member is biased, the lip defining a first recess at a location corresponding to a first operating position of the handle assembly; and
a handle assembly release apparatus associated with the handle assembly, wherein the handle assembly release apparatus comprises a release member operable to both pivot about an axis transverse to a longitudinal axis of the unit, and impart a releasing force simultaneously to each of the first and second handle members to unlock the handle assembly from the first operating position, the releasing force at least partially reacted by the housing.

5. The unit of claim 4, wherein the lip comprises a second recess at a location corresponding to a second storage position of the handle assembly.

6. A walk-behind lawn mower comprising:
a housing operable for movement over a ground surface, the housing comprising a first and a second handle retention portion;
a handle assembly comprising a first and a second handle member pivotally coupled to the first and second handle retention portions, respectively, the handle assembly operable to be selectively locked, relative to the housing, in a first operating position; and a handle assembly release apparatus associated with the housing and operable to unlock the handle assembly from the first operating position, wherein the handle assembly release apparatus comprises a lever member operable to: simultaneously wedge between the first handle member and the first handle retention portion and between the second handle member and the second handle retention portion; and simultaneously apply a separating force between the first handle member and the first handle retention portion and between the second handle member and the second handle retention portion, and further wherein the lever member pivots about an axis that is generally horizontal and transverse to a longitudinal axis of the lawn mower.

* * * * *